July 18, 1967  B. MIGNEN  3,331,102
PRODUCTION OF OPHTHALMIC LENSES OF MOULDED THERMOSETTING RESIN
Filed Feb. 15, 1965   2 Sheets-Sheet 1
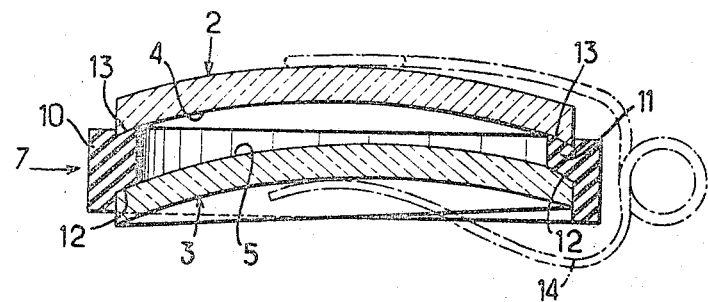
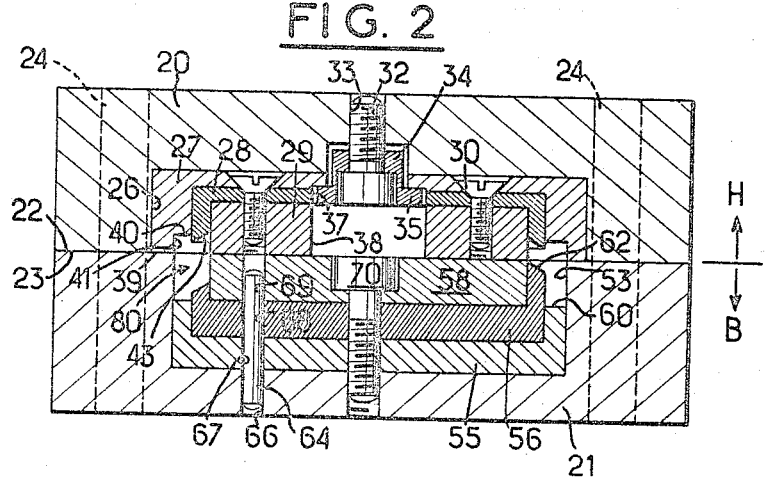
INVENTOR
BERNARD MIGNEN
By Irwin S. Thompson
ATTY.

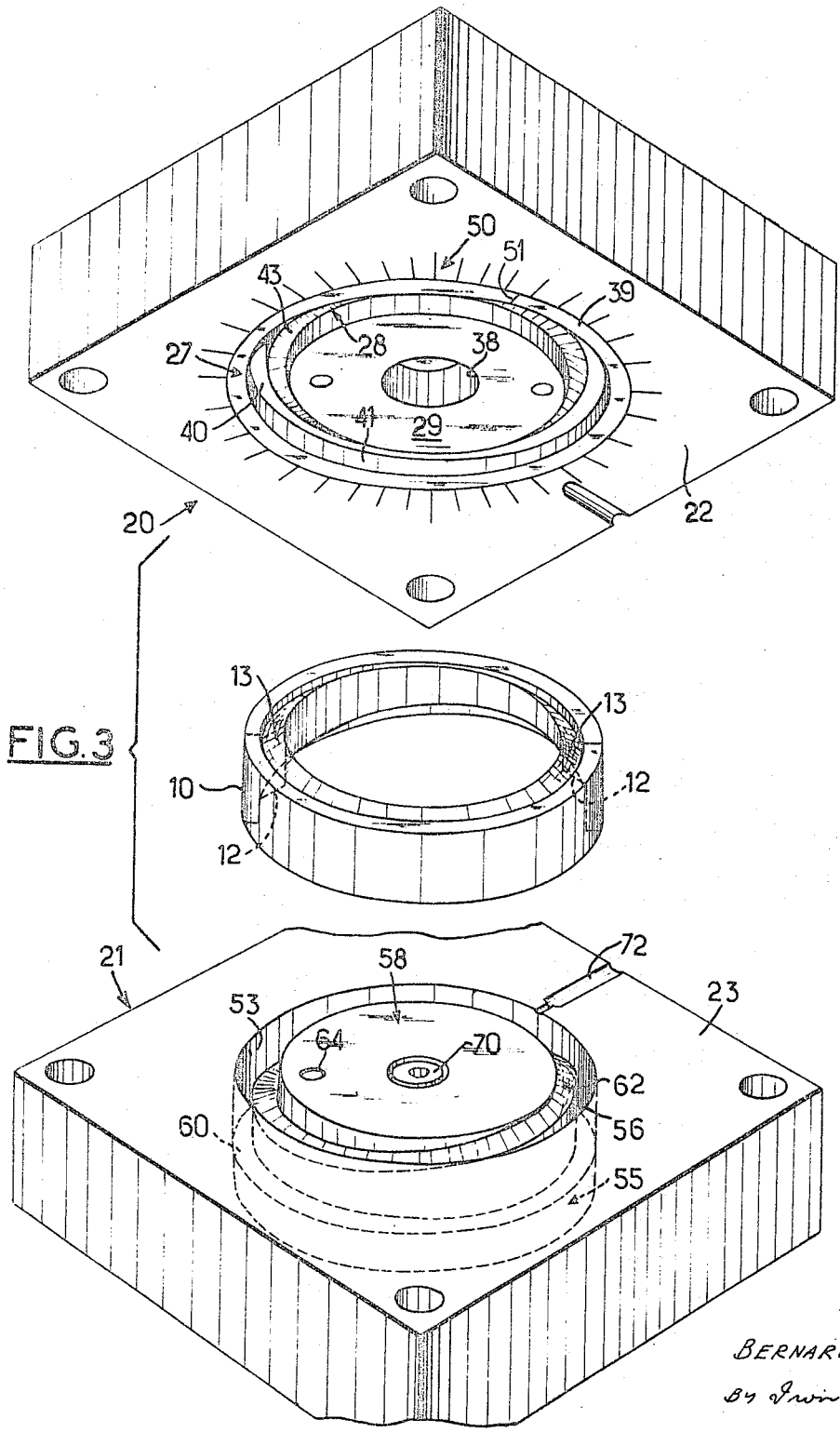

United States Patent Office 3,331,102
Patented July 18, 1967

3,331,102
PRODUCTION OF OPHTHALMIC LENSES OF MOULDED THERMOSETTING RESIN
Bernard Mignen, Saint-Maur-des-Fosses, France, assignor to Lentilles Ophthalmiques Rationnelles S.A., Paris, France, a corporation of France
Filed Feb. 15, 1965, Ser. No. 432,718
Claims priority, application France, Feb. 21, 1964, 964,660
6 Claims. (Cl. 18—34)

ABSTRACT OF THE DISCLOSURE

A mold for the production of plastic annular joints which in turn, in association with two appropriate glass discs, form a molding device for a synthetic resin ophthalmic lens. The mold for the plastic joint comprises two half-molds in each of which is formed a cylindrical recess having a removable and demountable assembly. The assembly is rotatable about the mold axis and has surfaces which depart from any surface of rotation about the mold axis. Indicia on the fixed and the demountable portions permit rotation of the removable assembly to form joints for the production of lenses of a number of different curvatures.

---

The present invention relates to improvements in the production of ophthalmic lenses of moulded thermosetting resin.

It is known that ophthalmic lenses may be produced by the polymerisation of a monomeric synthetic resin introduced in the liquid condition into moulds of toughened glass having thin walls and parallel faces, the elements of the mould being connected by a joint of plastic material. This joint has the form of a tore of rectangular section whose inner face carries a radical fin forming two annular bearing faces, opposed to each other, and on which bear the moulding faces of the associated glass moulds. It thus keeps the moulds spaced apart by the required distance, and moreover assures the mould is fluid-tight.

The joint should be able to follow the contraction of the resin in the course of polymerisation, and it is made of appropriate plastic material injected into a die by means of a press.

It is the joint which determines the relative position of the moulding faces of the glass moulds, and therefore the joint should be made with strict accuracy as a function of the lens characteristics to be obtained. This is applicable specifically for spherical or toroidal prismatic lenses.

It is a main object of the invention to provide a mould for the production of plastic joints of the kind described above.

According to the invention there is provided a mould for the production of plastic annular joints which, in association with two appropriate glass discs, form a moulding device for a synthetic resin ophthalmic lens, each joint having the shape of a tore of rectangular section whose inner face carries a radial fin forming two opposed annular bearing faces intended to bear the moulding faces of the associated discs, characterised in that it comprises two half-moulds which may be assembled along a separation plane, in each of which half-moulds is formed a cylindrical recess housing a removable and demountable assembly comprising a cup, a dish engaged in the said cup, and a central core engaged in the said dish, the rim of the dish having a contour complementary to that of the said annular bearing faces and its outer diameter being equal to the inner diameter of the said inner face of the tore, the half-moulds and the removable assemblies being formed in such manner that in the assembled condition of the mould they delimit between them an annular space into which opens a passage adapted to be connected to an injection press.

By careful selection of the elements forming the removable assemblies, one may thus, with a relatively small number of these elements, obtain a multiplicity of combinations allowing the required multiplicity of joints to be produced.

In order that the invention may be more clearly understood, an embodiment thereof will now be described, by way of example, with reference to the accompanying drawings, in which:

FIGURE 1 is a view in section of an assembly for the moulding of a prismatic ophthalmic lens and shows a joint of plastic material situated between two moulding shells held in position by an elastic clamping clip, FIGURE 2 is a view in section of one embodiment of a mould according to the invention, and FIGURE 3 is a view in perspective of the mould of FIGURE 2, after separation into two parts and withdrawal of the moulded joint, the upper part being seen along the line H—H of FIGURE 2, and the lower part along the line B—B of this same figure, these two parts encompassing the corresponding moulded joint.

A moulding assembly intended for the production of ophthalmic lenses is shown in FIGURE 1 and comprises two glass shells 2 and 3, whose moulding faces 4 and 5 are respectively concave and convex in this example, and a joint 7 of plastic material, having the form of an annular ring 10 formed with an inner radial fin 11. This fin provides two annular opposed bearing faces 12 and 13 contoured in such manner as to receive the corresponding moulding faces 4 and 5 of the shells 2 and 3, being faces whose contour they match, the sections of said shells then being situated in alignment with the inner face of the ring 10. An elastic clip 14 secures the moulding assembly by clamping the shells 2 and 3 against the bearing faces 12 and 13.

In preparing a mould for the production of a prismatic lens, as in the case of FIGURE 1, provision is made for obtaining the prismatic form by inclining the axis of the convex moulding face 5, which face is always spherical, with respect to the axis of the ring 10. When this prismatic lens is simply spherical, the concave moulding face 4 is spherical, its axis coinciding with that of the annular ring 11, whereas when this lens is toroidally prismatic, it is the said concave face which is toroidal.

The annular bearing faces 12 and 13 of the joint 7 should thus be spherical in the first case and have its axis inclined relative to that of the ring 10, and in the second case, the bearing faces should be spherical or toroidal depending on the case in question.

Since the characteristics of the lenses to be produced vary very considerably, and since they are determined by the moulding shells and associated joint employed, the number of different joints which must be moulded for the production of the lenses is very great, as will in consequence be the number of moulds to be employed for the production of these joints.

The invention provides a mould comprising removable and interchangeable elements, allowing of the production of the very diverse joints needed for the production of spherical or toroidal prismatic ophthalmic lenses.

One embodiment of a mould according to the invention is shown in section in FIGURE 2.

The mould which is wholly made of metal, comprises two half-moulds or boxes 20 and 21 in the form of parallelepipeds superimposed on each other with two corresponding plane faces 22 and 23, of square section, one of the boxes being provided with four guide posts 24, at right angles to the faces 22 and 23 and engaged in corresponding bores of the other box.

In the box 20, at the center of the face 22, is formed a flat-bottomed cylindrical recess 26 in which is situated a demountable assembly comprising a cup 27, a dish 28 engaged in this cup and a disc-shaped core 29 engaged in the said dish.

This assembly is held together by means of screws 30 having countersunk heads, and is secured in position in the box 20 by means of an axial screw 32 screwed into a central tapping 33 in the box 20, and engaged in a ring unit 34 having a flange 35 which bears on the bottom of the cup 27; bores 37 and 38 allowing free passage of the said flange being formed in the dish 28 and the disc 29.

The cup 27 is a slight frictional fit in the recess 26 of the box 20 and its height is equal to the depth of the said recess, the rim surface 39 of this cup thus lying in the plane of the face 22 of the box 20. A step milled in the rim of the cup 27 forms an annular bearing face 40 joined to the end of the said cup by a cylindrical surface 41. The dish 28 has an outer diameter corresponding to that of the moulding shells 2 and 3 and is engaged without appreciable radial play in the cup 27, and its peripheral rim projects relative to the annular bearing face 40, the surface 43 of this rim being machined to reproduce the contour of the moulding face of a particular moulding shell, which will be associated with the joint produced in the mould thus formed, for example the face 4 of the shell 2 of FIGURE 1.

The disc 29 which is engaged in the dish 28 is selected appropriate to the dish, its thickness being such that the sum of this thickness and of that of the bottom of the dish 28 is equal to the difference between the depth of the recess 26 and the thickness of the bottom of the cup 27. In this way, the exposed face of the disc 29 is situated in the plane of the face 22 of the box.

In the case in which the moulding surface 4 of shell 2, and thus that of the surface 43, is toroidal, it is necessary to be able to calibrate and regulate the orientation of the main axes of this surface with respect to the box 20.

To this end, as shown in FIGURE 3, a scale 50 is marked on the face 23 on the periphery of the recess 26, and a mark 51 is engraved on the surface 39 of the cup 27. The screw 32 being loosened, the assembly 27, 28, 29 may be turned in the recess 26 to a desired position and then locked in that selected position by tightening the screw 32.

In the face 23 of the box 21 there is formed a cylindrical recess 53 having an inner diameter equal to that of the cylinder formed by the surface 41 of the cup 27, and having the same axis as the recess 26 when the boxes 20 and 21 are assembled. In this recess is situated a removable and demountable assembly consisting of three elements engaged in each other namely a cup 55, a dish 56, and a central core or disc 58.

The height of the cup 55 is smaller than the depth of the recess 53, its rim surface 60 thus being set back with respect to the face 23 of the box 21.

Concerning the dish 56, having a diameter equal to that of the cup 28, it has a peripheral rim projecting beyond the said surface 60, the surface 62 of this rim being machined to reproduce the contour of the moulding face of a particular shell, for example of the face 5 of the shell 3 of FIGURE 1. The spherical surface enveloping this surface 62 is more or less inclined relative to the plane of the face 23 as a function of the prismatic effect to be obtained, and different cups are supplied, corresponding to the prismatic angles desired. The disc 58 is engaged in the dish 56, the height of the fitted assembly corresponding to the depth of the recess 53 as previously.

To establish the axis of the prism relative to the box 21, and thus relative to the box 20, on assembling the mould, a guide pin or peg 64 is housed in a bore 66 in the bottom of the box 21 and traverses bores 67, 68 and 69 formed in the cup 55, the dish 56 and the disc 58.

A central screw 70 asssures the fastening of the assembly in the box 21.

An injection passage 72 for connection to an injection press, which is not illustrated, is formed in the face 23 of the box 21 and opens into the recess 53.

As is apparent in FIGURE 2, when the two boxes are in abutment, the discs 29 and 58 are in contact and an annular moulding or pressing cavity 80 is formed, which cavity may be connected to an injection press through the passage 72.

This impression determines the characteristics of the joint, the bearing faces 12 and 13 of this latter being established by means of the surfaces 43 and 62 of the dishes 28 and 56. As has been seen, the prismatic effect is obtained by judicious selection of the dish 56 and the axis of the tore is established by appropriate rotation of the assembly 27, 28, 29 in the box 20.

The thickness of the finished moulded lens naturally depends on the joint employed, that is to say on the distance between the surfaces 43 and 62.

To regulate this distance, a set of cups 55 is available, having different base thicknesses, and each cup 55 has assoicated with it a disc 58 of such thickness that the height of each assembly consisting of the cup 55, the dish 56, and the disc 58 is always equal to the depth of the recess.

In order to produce the joint needed for the moulding of a given toroidal or spherical prismatic lens, a dish 28 is chosen corresponding to the desired toroidal or spherical power, the dish is placed in position between the cup 27 and the disc 29, the assembly thus formed is secured in the box 20 with the orientation desired in the case of a toroidal surface.

A dish 56 corresponding to the prismatic power and effect required is then associated with a set consisting of a cup 55 and a disc 58, selected as a function of the thickness to be imparted to the final lens, the assembly being secured in the box 21. The mould required is obtained by assembling the boxes 20 and 21.

The material used for the production of the joint should fulfil certain conditions already specified hereinabove.

It should in particular have sufficient plasticity at the polymerisation temperature to allow of squashing of the joint by 15% in such manner as to follow the contraction of polymerisation of the synthetic resin.

This material should moreover be inert in respect of the polymerisation of this resin, and should not cause the same to be inhibited.

I claim:

1. A mold for the production of plastic annular joints which, in association with two appropriate glass discs, form a molding device for a synthetic resin ophthalmic lens, each joint having the shape of a tore or rectangular section whose inner face carries a radial fin forming two opposed annular bearing faces intended to bear the molding faces of the associated discs, characterized in that it comprises two half-molds which may be assembled along a separation plane, in each of which half-molds is formed a cylindrical recess housing a removable and demountable assembly comprising a cup, a dish engaged in the said cup, and a central core engaged in the said dish, the rim of the dish having a contour complementary to that of the said annular bearing faces and its outer diameter being equal to the inner diameter of the said inner face of the store, the half-molds and the removable assemblies being formed in such manner that in the assembled condition of the mold they delimit between them an annular space into which opens a passage adapted to be connected to an injection press, one of the removable assemblies being adapted for rotation about its axis, and comprising a dish whose rim has a profile complementary to that of a toroidal bearing face, means for the angular locking of this dish with respect to the cup and core associated with it, while in the other removable assembly, the axis of the spherical space enclosed by the rim of the associated dish being inclined by a definite angle relative to that of the said dish, the bearing face engendered on the joint by this rim thus being inclined with respect to the axis of the joint.

2. A mold according to claim 1, characterized in that said other removable assembly comprises, in addition to a dish having an inclined rim, a cup selected from a series of cups whose bases are of different thicknesses.

3. A mold according to claim 1, characterized in that said locking means comprises a screw coaxial with said cylindrical recess.

4. A mold for the production of plastic annular joints which, in association with two appropriate glass discs, form a molding device for a synthetic resin ophthalmic lens, each joint having the shape of an annulus whose inner face carires a radial fin forming two opposed annular bearing faces intended to bear the molding faces of the associated discs, characterized in that it comprises two half-molds which may be assembled along a separation plane, in each of which half-molds is formed a cylindrical recess housing a removable and demountable assembly comprising a cup, a dish engaged in the said cup, and a central core engaged in the said dish, the rim of the dish having a contour complementary to that of the said bearing faces and its outer diameter being equal to the inner diameter of the said inner face of the annulus, the half-molds and the removable assemblies being formed in such manner that in the assembled condition of the mold they delimit between them an annular space into which opens a passage adapted to be connected to an injection press, at least one of the removable assemblies being rotatable about its axis in its associated said recess, said dish of said one assembly having a rim having a profile complementary to that of a said annular bearing face which diverges from all surfaces which are figures of rotation about said axis, said cup of said one assembly having a rim having a surface disposed in said separation plane, and indicia on said rim surface and on the associated said half-mold in said separation plane for indicating the rotated position of said one removable assembly relative to said associated half-mold, and means for releasably locking said one assembly in any of a plurality of positions of rotation about its axis relative to said associated half-mold.

5. A mold according to claim 4, the other said removable assembly having a said dish rim contour complementary to a figure of rotation about an axis inclined to the said axis of rotation of said one assembly.

6. A mold according to claim 4, characterized in that said locking means comprises a screw coaxial with said cylindrical recess.

References Cited
UNITED STATES PATENTS

| | | | |
|---|---|---|---|
| 34,344 | 2/1862 | Baldwin | 18—34 |
| 2,516,373 | 7/1950 | Ehlert et al. | 18—34 |
| 2,558,027 | 6/1951 | Wilson. | |
| 2,559,861 | 7/1951 | Fay | 18—36 |
| 2,635,289 | 4/1953 | Owens | 18—42 X |
| 3,273,204 | 9/1966 | Craddock | 18—42 X |

WILLIAM J. STEPHENSON, *Primary Examiner.*